3,383,341
STABLE RUBBER LATEX FOAMS CONTAINING SODIUM HEXAMETAPHOSPHATE
Thomas Trogdon, Waynesville, and Howard S. Smith, Asheville, N.C., assignors to Dayco Corporation, a corporation of Delaware
No Drawing. Filed Jan. 18, 1965, Ser. No. 426,349
4 Claims. (Cl. 260—18)

ABSTRACT OF THE DISCLOSURE

Stable rubber latex foams using fillers of feldspar are obtained by using a sequestering agent which forms a chelate with the water soluble calcium or magnesium ions of the filler. Unless the soluble ions are rendered inactive, they tend to react with the foam stabilizing soap to form insoluble foam inhibiting products. Sodium hexametaphosphate is a suitable sequestering agent for such soap reactive ions.

---

This invention relates to a rubber latex compound and a method of making such a compound. More specifically, it relates to a compound utilizing a filler which increases the bulk of the compound at low cost, which compound may be used to manufacture foam rubber products.

Foam rubber products have been manufactured by several methods, all of which utilize a rubber latex compound which is subsequently processed so that the latex material is expanded and set in its expanded form as a finished product. While it is possible and in many cases practical to utilize a pure rubber latex compound for this purpose, it has been found economically feasible to load these compounds with fillers of various types in order to reduce the total cost of the compound. These fillers may be materials which are considerably less expensive than latex, such as clay, talc, feldspar, and the like. It is, of course, well known to use such fillers in various rubber compounds used for solid, rather than foamed rubber products, but the present invention relates specifically to latex utilized in foamed rubber products.

In many instances these fillers are sufficiently inert from a chemical standpoint so that they may be added to a conventional latex compound without creating any adverse reaction between the filler and other materials. These inert fillers are usually incorporated in a dry state and have little effect on the foaming operation or the subsequent properties of the foamed material. However, certain of the fillers have been found to give rise to undesirable reactions which may be substantially eliminated by the use of additional materials in the compound in order to overcome the tendency of the filler to react with other portions of the compound. The present invention deals with the use of such other materials which may be described as sequestering agents. These agents may be defined as materials which are used to prevent ions from exhibiting their usual properties due to a close combination with other material.

It is therefore a principal object of this invention to provide a rubber latex compound incorporating fillers of a special type.

It is a further object to add a sequestering agent which will inhibit any tendency of the filler to react with other materials in the compound.

It is a further object to prevent the formation of undesirable materials due to reaction of the filler and other materials in the compound.

These and other objects of the invention will be readily apparent in the following specification and claims.

As previously mentioned, it has been common practice to utilize various fillers in latex compounds, but these are not always satisfactory when these compounds are used in making foam rubber products. For example, the true talcs, with their needlelike shapes, do not lend themselves to making foam rubber that releases properly from the mold. The clay materials are very fine, running something under one micron in diameter, which creates large surface areas; this in turn has a tendency to pull an excessive amount of water from the solution. Feldspars provide the necessary properties of bulk and low cost, and in addition are usually found in sizes ranging from about two to 50 microns, which is a desirable range from the standpoint of surface area. The term "feldspar" is generic for a group of silicate minerals having the formula $NaAlSi_3O_8$, $KAlSi_3O_8$, $CaAl_2(SiO_4)_2$, or $BaAl_2(SiO_4)_2$. Several other variations of these potassium, sodium, barium and calcium aluminosilicates are also included in this generic term. It has been found that the use of certain types of feldspars contains small amounts of soluble calcium and magnesium ions which react with the soap that is found in the rubber latex emulsions or is provided in free form to assist in the compounding. This reaction tends to precipitate insoluble calcium and magnesium salts which react with the soap and tend to destabilize the compound, making proper foaming of the material very difficult. In accordance with the present invention, this tendency to react is substantially eliminated by combining a sequestering agent into the compound; this agent forming a chelate with the calcium and magnesium ions in the feldspar to achieve this inhibiting effect.

It was found by experimentation that all sequestering agents were not effective for this purpose and sodium hexametaphosphate was found to provide excellent results. In order to determine whether other sequestering agents would provide desirable results, certain other agents were evaluated and found to be impractical. In comparing agents, it was first necessary to evaluate the frothability of the feldspar filler, and the following procedure was adopted:

(1) 100 parts by weight of a 6% ammonium soap solution was placed in a mixing bowl.

(2) 50 parts of feldspar was also placed in the mixing bowl and thoroughly dispersed in the soap solution. The feldspar contained soluble magnesium or calcium ions.

(3) The mixing bowl was placed on a high speed mixer and mixed at high speed for one minute.

(4) The mixer was shut off and the bowl removed from the mixer.

(5) A straight edge was placed across the top of the bowl and the distance was measured to the top of the foam which was created during the mixing operation. The distance was recorded as a measure of the frothability of the soap and filler dispersion.

When the particular feldspar used was checked, it was found that the foam was very coarse, and the foam was 4½ inches from the top of the bowl. This compared unfavorably with a uniform foam and a distance of about 2 inches from the top created by acceptable fillers, and was an indication of the presence of soluble calcium or magnesium ions in the particular material.

In order to determine the efficiency of the sequestering agent, the above tests were run again with the exception that 0.5% by weight of the various sequestering agents was added to the soap solution prior to the addition of the filler. The frothability was measured as above immediately after mixing, and in addition was checked after aging for 24 hours and again checked after aging for 48 hours. A comparison of sodium hexametaphosphate with other sequestering agents revealed the following:

EFFECT OF SEQUESTERING AGENTS ON FROTHABILITY OF SOAP-FILLER DISPERSION

|  | Sodium hexametaphosphate | Ammonium salt of ethylene diamine tetraacetic Acid | Ethylene diamine diacetic acid; ethylene bisimino diacetic acid |
|---|---|---|---|
| Percent by weight added to soap solution | 0.50 | 0.50 | 0.50 |
| Frothability of dispersion: |  |  |  |
| Immediately | 1½″ | 1⅝″ | 1⅞₁₆″ |
| After 24 hrs. aging | 1½″ | 3³⁄₁₆″ | 2½″ |
| After 48 hrs. aging | 1½″ | Failed after 24 hrs | Failed after 24 hrs. |
| Froth appearance: |  |  |  |
| Immediately | Uniform | Uniform | Uniform. |
| After 24 hrs. aging | ----do-- | Coarse | Coarse. |
| After 48 hrs. aging | ----do-- |  |  |

The above results indicate the advantages of sodium hexametaphosphate as a sequestering agent when compared with other materials.

The actual compounding procedure for the latex involved first the use of a rubber latex emulsion containing free soap such as an oleate soap, one of the class known as mono-unsaturated soaps. To this is added a solution consisting of the sequestering agent, preferably sodium hexametaphosphate, and an ammonium soap such as ammonium ricinoleate soap, which is also a mono-unsaturated soap; the agent and the soap represent a total of 4.75 parts by weight compared to 100 parts of the latex emulsion. The relationship of the latex to the sequestering agent is approximately 0.25 to 0.50 part of the agent per 100 parts of latex emulsion. After the above solution is added to the latex emulsion, additional materials are added; the entire compound is listed below:

|  | Parts |
|---|---|
| Rubber latex emulsion | 100 |
| Sodium hexametaphosphate-soap solution | 4.75 |
| Aqueous ammonia | 1.20 |
| Oil | 10.00 |
| Antioxidant | 1.25 |
| Feldspar | 55.00 |
| Zinc oxide-ethyl zimate slurry | 5.00 |
| Accelerator | 1.25 |
| Anionic stabilizer | 0.375 |
| Wetting agent | 0.375 |

The above compound is mixed in any conventional agitator at high speeds during compounding, then reduced to lower speed.

The above compound produces a rubber latex which is highly useful in the manufacture of foam rubber products as it offers an inexpensive yet highly stable material. The use of the specific fillers; namely, a feldspar having soluble calcium and magnesium ions is made possible by the incorporation of the proper sequestering agent.

The above procedures and compounds are not intended to be limiting, but merely exemplary of the novel concept embodied within the scope of the invention.

We claim:
1. A reaction product of a rubber latex including a mono-unsaturated soap, a feldspar filler having soluble components producing ions selected from the group consisting of magnesium and calcium and combinations thereof, and sodium hexametaphosphate, said ions being reactive in the absence of said hexametaphosphate to produce insoluble calcium and magnesium salts, said latex being present in an amount by weight of 100 parts, and said hexametaphosphate being present in an amount by weight of 0.25 to 0.50 part by weight per 55 parts of feldspar.

2. In a rubber latex compound including a latex emulsion, a vulcanizing agent, an accelerator, and a water soluble mono-unsaturated soap for forming a stable foam, the steps of adding to said compound a feldspar filler containing soluble ions selected from the group consisting of calcium and magnesium, and mixtures thereof, capable of reacting with said soap to form foam inhibiting insoluble products, said latex being present in an amount by weight of 100 parts, adding to said compound sodium hexametaphosphate in an amount by weight between 0.25 to 0.50 part by weight per 55 parts of feldspar to form a chelate with said soluble ions to prevent reaction thereof with said soap to form said foam inhibiting insoluble products.

3. In a rubber latex compound as set forth in claim 2, the steps of adding said soap and said hexametaphosphate in an aggregate amount of 4.7 parts by weight per 100 parts by weight of said latex emulsion.

4. The method as set forth in claim 2 wherein said feldspar filler is a particulate material having a particle size in the range of 2 to 50 microns.

References Cited

UNITED STATES PATENTS

| 2,706,183 | 4/1955 | Carter | 260—743 |
| 2,947,715 | 8/1960 | Charlet et al. | 260—2.5 |
| 2,955,094 | 10/1960 | Brodkey et al. | 260—2.5 |
| 3,006,868 | 10/1961 | Stamberget et al. | 260—743 |
| 3,264,232 | 8/1966 | Lucke | 260—2.5 |

ALLAN LIEBERMAN, *Primary Examiner.*